US008389932B2

(12) United States Patent
Li et al.

(10) Patent No.: US 8,389,932 B2

(45) Date of Patent: Mar. 5, 2013

(54) STACKED-ELECTRODE PEPTIDE-FRAGMENTATION DEVICE

(75) Inventors: Guo-Zhong Li, Westborough, MA (US); Joseph A. Jarrell, Newton Highlands, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 13/000,169

(22) PCT Filed: Jun. 30, 2009

(86) PCT No.: PCT/US2009/049133

§ 371 (c)(1), (2), (4) Date: Feb. 22, 2011

(87) PCT Pub. No.: WO2010/002819

PCT Pub. Date: Jan. 7, 2010

(65) Prior Publication Data

US 2011/0266434 A1 Nov. 3, 2011

Related U.S. Application Data

(60) Provisional application No. 61/077,270, filed on Jul. 1, 2008.

(51) Int. Cl.
*H01J 49/26* (2006.01)
*B01D 59/44* (2006.01)

(52) U.S. Cl. .......................... 250/282; 250/281; 250/288

(58) Field of Classification Search .................. 250/281, 250/282, 288, 290, 292
See application file for complete search history.

(56) References Cited

U.S. PATENT DOCUMENTS 4,968,888 A * 11/1990 Appelhans et al. ............ 850/63
5,595,643 A 1/1997 Torimoto et al.
6,653,622 B2 11/2003 Franzen
6,717,130 B2 4/2004 Bateman et al.
6,800,851 B1 10/2004 Zubarev et al.
6,803,569 B2 10/2004 Tsybin et al.
6,844,547 B2 1/2005 Syka
6,987,261 B2 1/2006 Horning et al.
7,026,613 B2 * 4/2006 Syka ............................ 250/292
7,049,584 B1 * 5/2006 Whitehouse et al. ......... 250/288
7,145,139 B2 * 12/2006 Syka ............................ 250/292
7,157,698 B2 1/2007 Makarov et al.
7,355,169 B2 * 4/2008 McLuckey et al. ........... 250/282
8,227,748 B2 * 7/2012 Berg et al. ..................... 250/283
8,283,626 B2 * 10/2012 Brown et al. ................. 250/282
2004/0155180 A1 8/2004 Zubarev
2004/0232324 A1 11/2004 Berkout et al.
2004/0245448 A1 12/2004 Glish et al.

(Continued)

OTHER PUBLICATIONS

Deguchi, et al., "Structural Analysis of O-glycopeptides employing negative- and positive-ion multi-stage mass spectra obtained by collision-induced and electron-capture dissociations in linear ion trap time-of-flight mass spectrometry"; Rapid Commun. Mass Spectrom, 2007;21:691-698.

(Continued)

*Primary Examiner* — Bernard E Souw

(74) *Attorney, Agent, or Firm* — Water Technologies Corp.

(57) ABSTRACT

A chemical processing apparatus includes a fragmentation device that includes a linear set of stacked electrodes and a voltage control module that forms DC potential wells of opposite polarity for mutual confinement of opposite polarity ions. A method of protein analysis includes confining positive peptide ions and negatively charged reagent anions in, respectively, first and second DC potential wells in a fragmentation device, mixing the ions, in the fragmentation device, and analyzing ion fragments formed in the mixture.

17 Claims, 7 Drawing Sheets

U.S. PATENT DOCUMENTS

| | | | | |
|---|---|---|---|---|
| 2004/0245452 | A1* | 12/2004 | Bateman et al. | 250/287 |
| 2005/0017165 | A1 | 1/2005 | Franzen | |
| 2005/0017167 | A1 | 1/2005 | Franzen | |
| 2005/0092910 | A1 | 5/2005 | Geromanos et al. | |
| 2005/0178955 | A1 | 8/2005 | Baba et al. | |
| 2005/0199804 | A1 | 9/2005 | Hunt et al. | |
| 2005/0258353 | A1 | 11/2005 | Berkout et al. | |
| 2005/0263695 | A1* | 12/2005 | Syka | 250/291 |
| 2006/0138320 | A1 | 6/2006 | Bateman | |
| 2007/0084998 | A1* | 4/2007 | Franzen et al. | 250/287 |
| 2008/0014656 | A1* | 1/2008 | Thomson | 436/173 |
| 2008/0128610 | A1* | 6/2008 | McLuckey et al. | 250/283 |
| 2011/0284738 | A1* | 11/2011 | Berg et al. | 250/283 |

OTHER PUBLICATIONS

Douglas, et al., "Linear Ion Traps in Mass Spectrometry"; Mass Spectrometry Reviews, 2005, 24, 1-29.

Xia, et al., "Effects of Cation Charge-Site Identity and Position on Electron-Transfer Dissociation of Ploypeptide Cations"; J. Am. Chem. Soc., 2007, 129, 12232-12243.

Goods, et al., "Performance Characteristics of Electron Transfer Dissociation Mass Spectrometry"; Molecular & Cellular Proteomics, 2007, 6.11, 1942-1951.

Giles, et al., "Applications of a Travelling Wave-Based Radio-Frequency-Only Stacked Ring Ion Guide"; Rapid Commun. Mass Spectrom, 2004, 18, 2401-2414.

Greaves, et al., "Antimatter plasmas and Antihydrogen"; Phys. Plasmas, 4 (5), May 1997, 1528-1543.

Zubarev, "Electron-capture dissociation tandem mass spectrometry"; Current Opinion in Biotechnology, 2004, 15, 12-16.

Pringle, et al., "An investigation of the mobility separation of some peptide and protein ions using a new hybrid quadrupole-travelling wave IMS/oa-ToF instrument"; International Journal of Mass Spectrom, 261, 2007, 1-12.

McLuckey, et al., "Ion/Ion Chemistry of High-Mass Multiply Charged Ions"; Mass Spectrometry Reviews, 1998, 17, 369-407.

Zubarev, et al., "Electron Capture Dissociation of Multiply Charged Protein Cations. A Nonergodic Process."; J. A. Chem. Soc., 1998, 120, 3265-3266.

Baba, et al., "Electron Capture Dissociation in a Radio Frequency Ion Trap"; Anal. Chem. 2004, 76, 4263-4266.

Baba, et al., "Electron Capture Dissociation in a Radio-Frequency Linear Ion Trap"; Hitachi High Technologies America, Inc, Sales-LS@hitachi-hta.com, NanoFrontier Technical Note (E)-002, 2007, 6.

Syka, et al., "Peptide and protein sequence analysis by electron transfer dissociation mass spectrometry"; www.pnas.org/cgi/doi/10.1073/pnas.0402700101, Jun. 29, 2004, 101 (26), 9528-9533.

Giles, et al., "Applications of a travelling wave-based radio-frequency-only stacked ring ion guide"; Rapid Commun. Mass Spectrom. 2004, 18, 2401-2414.

Hornshaw, et al., "Electron Transfer Dissociation and Multi-Stage Activation Analysis of Human Kinase Sites of Phosphorylation"; Thermo Fisher Scientific, 2007.

PCT Int'l Written Opinion for US09/49133 dated Aug. 27, 2009.

PCT Int'l Search Report for Us09/49133 dated Aug. 27, 2009.

* cited by examiner

STACKED-ELECTRODE PEPTIDE-FRAGMENTATION DEVICE

RELATED APPLICATIONS

This application claims benefit of and is a continuation of International Application No. PCT/US2009/049133, filed 30 Jun. 2009, filed and designating the United States, which claims benefit of a priority from U.S. Provisional Patent Application No. 61/077,270, filed 1 Jul. 2008.

TECHNICAL FIELD

The invention generally relates to chemical processing methods and apparatus, and, in particular, to peptide fragmentation methods and devices that support peptide-sample separations.

BACKGROUND

In mass spectrometry, peptide ions are often fragmented prior to mass analysis. A relatively new method of peptide fragmentation entails reaction of peptide cations and reagent anions in quadrupole ion traps, in particular, in linear ion traps (LIT) based on a quadruple set of rod electrodes, which utilize radio-frequency (RF) fields for ion confinement. The technical literature typically refers to an ion-ion fragmentation reaction as Electron-Transfer Dissociation (ETD), in which electron transfer is assumed to be central to the reaction process.

In principal, as described by Liang, Hager and McLuckey, Analytical Chemistry, Vol. 79, pages 3363-3370 (2007), four methods provide peptide ion ETD reactions in a LIT. Three of these methods entail allowing cations and/or anions to pass through the LIT, i.e., only cations or anions, or neither, are confined in the LIT. These three methods use a DC potential barrier for axial confinement of ions of a single polarity (where “axial” is a conventional reference to the lengthwise direction of a LIT.) The fourth method simultaneously confines ions of opposite polarities (i.e., cations and anions) along the axial direction, through use of RF pseudopotential barriers or application, to the quadrupole rod set, of unbalanced RF fields. An axial pseudopotential barrier is formed, for example, with application, to containment lenses at the axial ends of the LIT, of RF oscillating potentials.

Optimal ion flow control is difficult to achieve with single-polarity confinement because the DC potential barrier, used for axial confinement of ions of a single polarity, acts as an accelerating potential for the opposite-polarity ions flowing through the LIT. Thus, the kinetic energy difference between the flowing ions and the confined ions may be too high for some ion-ion reactions to favorably occur; ETD researchers believe that the ion-ion reaction rate is inversely proportional to the cube of the relative velocity between the ions. Thus, mutual storage of peptide cations and reagent anions is expected to provide the lowest relative ion velocities, for more efficient dissociation.

Mutual confinement, however, as indicated, above, typically requires more complex use of RF voltages. Moreover, the barrier height of an RF-generated pseudopotential barrier is a function of the mass-to-charge ratio of the ions being stored, thus restricting the mass range of analyte or reagent ions that can be mutually confined for ion-ion reactions.

As an alternative to reliance on RF fields for mutual confinement, two separate quadrupole rod sets, i.e., two adjacent LITs, are used to separately store cations and anions in the two adjacent LITs, prior to allowing ions from one LIT to flow through the other LIT. Such an approach to mutual confinement, however, increases the complexity and cost of a fragmentation device.

SUMMARY

Some embodiments of the invention provide mutual confinement of opposite-polarity ions in a linear fragmentation device that does not rely on axial pseudopotential barriers, unbalanced RF fields, or two adjacent ion traps. In particular, some embodiments of the invention arise from the realization that mutual confinement of opposite-polarity ions, for peptide fragmentation, is advantageously accomplished in a linear stacked-electrode based fragmentation device, using DC potentials for axial confinement of both polarity types.

One such device includes, for example, a set of stacked-rings, such as those found in a stacked-ring ion guide (SRIG); the device has DC voltage control features that provide simultaneous storage, mixing, and/or release of positive ions and negative ions, or electrons, through use of discrete potential wells. In some alternative embodiments, a stacked-electrode-based fragmentation device can also be used for mass-related analysis of the ions and/or fragments, and/or can selectively eject ions and/or fragments for further analysis by downstream modules. Moreover, with application of an axial magnetic field, mutual confinement of peptide ions and electrons optionally supports peptide fragmentation via reaction of peptide ions and free electrons.

Thus, some embodiments of the invention provide a means of mutually confining cations and anions to perform ETD without the disadvantages described above. Some embodiments of the present invention relate to apparatus for mass spectrometry that is designed to spatially manipulate and confine mixtures of ions with opposite-polarity charged particles, such as reagent ions and/or electrons, to fragment the ions. Some embodiments of the invention are suitable for ion-ion reactions such as ETD and proton-transfer reactions (PTR) and/or for electron-capture dissociation (ECD).

Accordingly, one embodiment of the invention is a method of protein analysis that includes confining positive peptide ions in a first DC potential well in an ion-manipulation region of a fragmentation device, confining negatively charged particles in a second DC potential well in the ion-manipulation region, reducing a DC barrier between the first and second DC potential wells to mix the positive peptide ions and the negatively charged particles, and mass analyzing peptide ion fragments derived from the mixture.

Another embodiment of the invention is a chemical processing apparatus that includes a fragmentation device. The fragmentation device includes stacked electrodes, which each define at least one aperture, disposed in series along an axial direction of the fragmentation device. The apertures define an ion-manipulation region. The apparatus also includes means for applying at least a first DC voltage to at least two contiguous electrodes to define a first DC potential well, and applying at least a second DC voltage to at least two different contiguous electrodes to define a second DC potential well, means for reducing a DC potential barrier between the first and second DC potential wells to permit positive peptide ions, confined in the first DC potential well, and negatively charged particles, confined in the second DC potential well, to mix, and a mass-spectrometry module for analyzing at least some fragments of the positive peptide ions extracted from the mixture.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

As used herein, the following terms generally refer to the indicated meanings:

DC—constant, or substantially constant, electrical potentials, voltages and/or currents. A DC electrical state can vary in time. For example, a DC voltage, in some cases, is transient or otherwise varies in time. A DC voltage is contrasted to an AC voltage, in particular, an RF voltage, which oscillates in time.

Protein—a specific primary sequence of amino acids assembled as a single polypeptide.

Peptide—a specific sequence of amino acids assembled as a single polypeptide contained within the primary sequence of a protein. As will be clear in context, "peptide" is used herein to refer to both peptides and polypeptides, including proteins.

Precursor peptides—peptide molecules that have yet to be fragmented in a fragmentation device. The precursors are optionally separated chromatographically prior to delivery to a fragmentation device. An ion source ionizes these precursor peptides to typically produce positively charged, protonated forms of the precursors.

Fragments—In context, fragments (or products) herein refer in particular to fragments of peptide ions, as formed in stacked-electrode based fragmentation devices of the invention. More generally, multiple types of fragments can occur in LC/MS analyses. In the case of tryptic peptide precursors, fragments can include polypeptide ions that are produced from collisional fragmentation of the intact peptide precursors and whose primary amino acid sequence is contained within the originating precursor peptide.

Some embodiments entail LC/MS analysis, in which precursor ions are fragmented in a fragmentation after LC separation and before MS analysis. Such analysis optionally provides an empirical description of a peptide in terms of its mass, charge, retention time, total intensity and other data. When a peptide elutes from the chromatographic column, it elutes over a specific retention time period and reaches its maximum signal at a single retention time. After ionization and (possible) fragmentation, the peptide appears as a related set of ions. The different ions in the set correspond to different isotopic compositions and charges of the common peptide. Each ion within the related set of ions produces a single peak retention time and peak shape. Since these ions originate from a common peptide, the peak retention time and peak shape of each ion is identical, within some measurement tolerance. Thus, typically, the MS acquisition associated with each peptide produces multiple ion detections for all isotopes and charge states, all sharing the same peak retention-time and peak shape within some measurement tolerance.

Figure 1A:
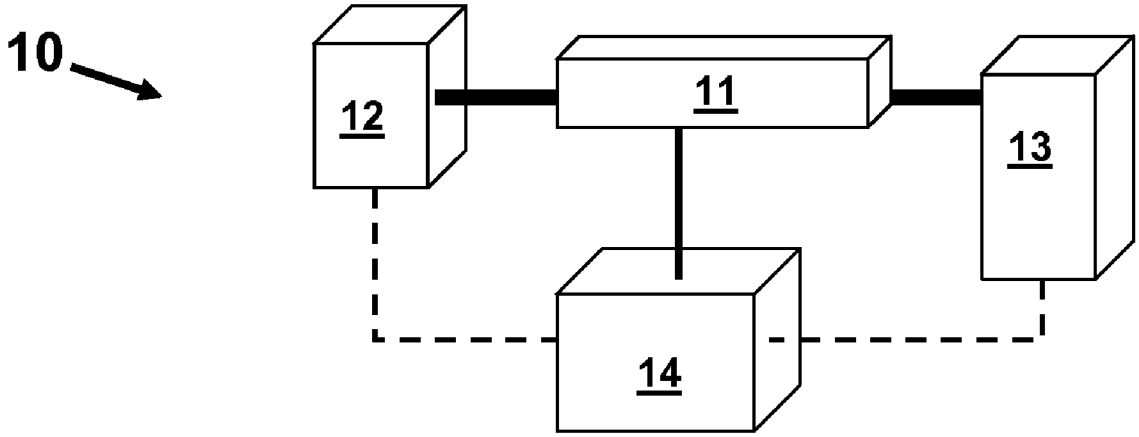
FIG. 1*a* is a block diagram of a chemical processing apparatus, in accordance with one embodiment of the invention.

FIG. 1*a* is a block diagram of chemical processing apparatus 10, according to one embodiment of the invention. The apparatus includes a fragmentation device 11 and a control unit 14, and optionally includes an ion supply module 12 and a mass-spectrometry module 13. The fragmentation device 11 includes a linear arrangement of electrodes, herein referred to as "stacked electrodes". The stacked electrodes optionally define a curved path through the device 11, but the device 11 would still be viewed herein as being "linear". The control unit 14 manages the application of voltages to the electrodes of the fragmentation device 11.

Figure 1B:
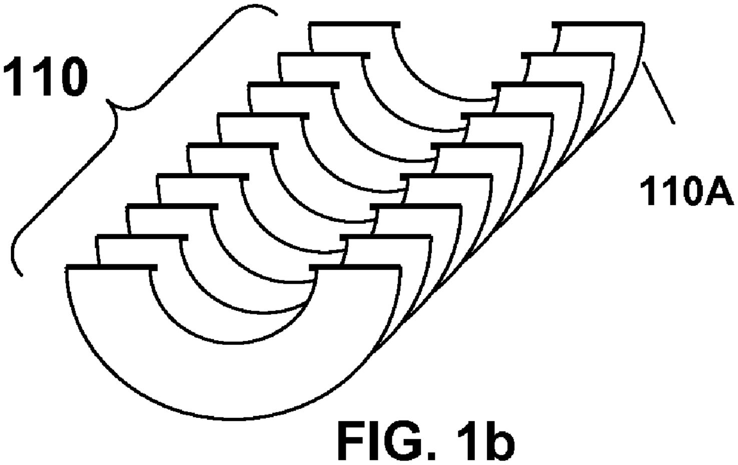
FIG. 1*b* is a cross-sectional three-dimensional diagram of a fragmentation device that includes stacked ring electrodes, in accordance with one embodiment of the invention.

FIG. 1*b* is a cross-section three-dimensional diagram of one optional embodiment of the fragmentation device 11. The device 11, in this example, includes a set 110 of stacked ring electrodes 110A, in a linear arrangement. Each ring electrode 110A has a central aperture; the co-linear arrangement of apertures defines an ion radial-confinement region and a longitudinal direction of the fragmentation device 11; a perpendicular direction, relative to the longitudinal direction, is herein referred to as a "radial" direction. The longitudinal direction is also referred to herein as the axial direction.

The apertures, in this example, are depicted as having a circular shape. Though preferred, the particular shape and/or size of the apertures are optionally varied, as desired. The apertures also define an ion-manipulation region and a reaction region, within the device 11.

As an illustrative example, the stacked electrodes 110A are optionally conductive circular stainless steel ring plates with a pitch of 1.5 mm, a thickness of 0.5 mm and a central aperture diameter of 5 mm. An argon buffer gas pressure of 0.076 Torr is optionally used. The length of the device is optionally 90 mm. The control unit 14 applies opposing phases of 100 V RF to adjacent electrodes 110A to provide radial confinement of positive and negative ions.

Next, use of fragmentation devices of the invention for mutual confinement of opposite polarity particles is described, for convenience, with reference to the fragmentation device 110 having stacked ring electrodes 110A. In view of the following description, however, it will be clear that principles of the invention are applicable to a variety of configurations of stacked electrodes.

Figure 2A:
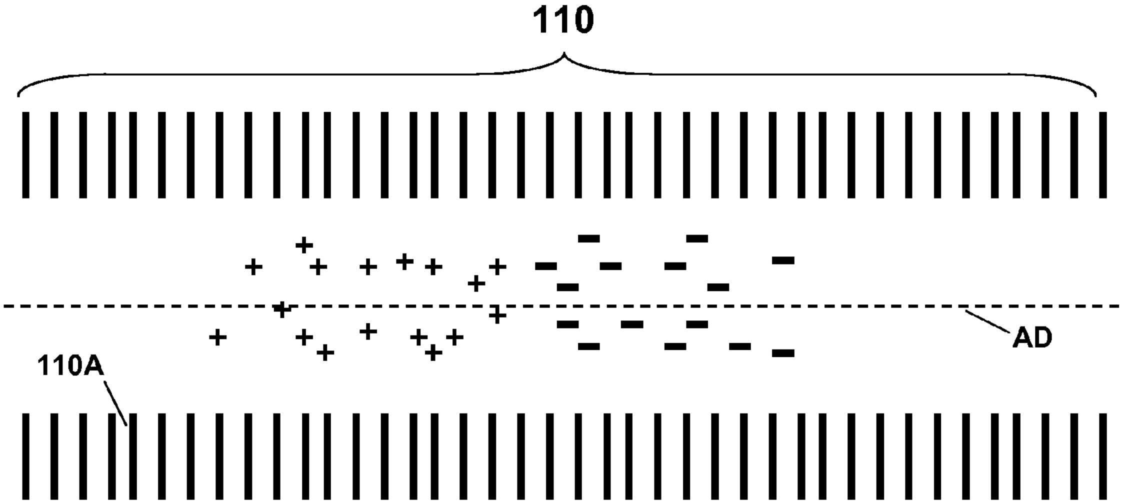
FIG. 2*a* is a cross sectional schematic view of a stacked-electrode fragmentation device, under a particular operating condition, in accordance with one embodiment of the invention.

FIG. 2*a* is a cross sectional schematic view of the set 110 of stacked ring electrodes 110A, under a particular operating condition, illustrating some general principles of one embodiment of the invention. The dashed line indicates the longitudinal axis AD, associated with the axial direction, of the device. The electrodes 110A contain positively charged peptide ions and negatively charged particles, such as reagent ions or electrons. The ions and particles are trapped in neighboring potential wells (see FIG. 2*b*.) The wells are formed through appropriate application, by the control unit 14, of DC voltages to the individual ring electrodes 110A.

Figure 2B:
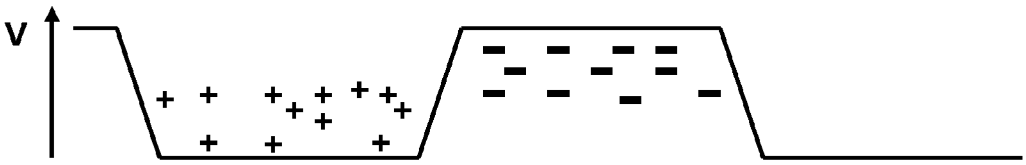
FIG. 2*b* is a qualitative graph of DC voltages applied to the electrodes shown in FIG. 2*a*, in accordance with one embodiment of the invention.

FIG. 2*b*, in association with FIG. 2*a*, is a qualitative graph of the DC potential along the device 11, as produced by applying DC voltages to the electrodes 110A (the confined peptide ions and charged particles are illustrated, for comparison to FIG. 2*a*.) More generally, the control unit 14 is configured to controllably and variably apply similar or different DC voltage potentials to the electrodes 110A to form negative or positive potential wells, of various length, depth and duration, as desired to separately and simultaneously confine negatively and positively charge particles in the fragmentation device 11. As illustrated in FIGS. 2*a* and 2*b*, a negative potential well has been created by applying a series of negative DC voltages to several adjacent electrodes 110A and, similarly, a positive potential well has been created by applying a series of positive DC voltages to a neighboring group of adjacent electrodes 110A.

In FIG. 2*b*, the peptide ions and the negative particles are illustrated as partially filling their associated wells at different energy levels. Ions with greater kinetic energy are depicted as residing nearer to the top of the associated well. Well depths are often chosen to be greater than an ion maximum kinetic energy level, to prevent ions from escaping from the well.

More generally, positive and negative particles are optionally confined in one or more wells, each well associated with one or more electrodes 110A having an applied DC voltage that is, respectively, lower or higher than a neighboring electrode.

Next, referring to FIG. 3*a* to FIG. 5, some optional methods of filling and forming DC potential wells, in apparatus of the invention, are described. Filling and forming of DC potential wells is accomplished in any suitable manner. A well, for example, is optionally partially formed prior to filling.

Figure 3A:
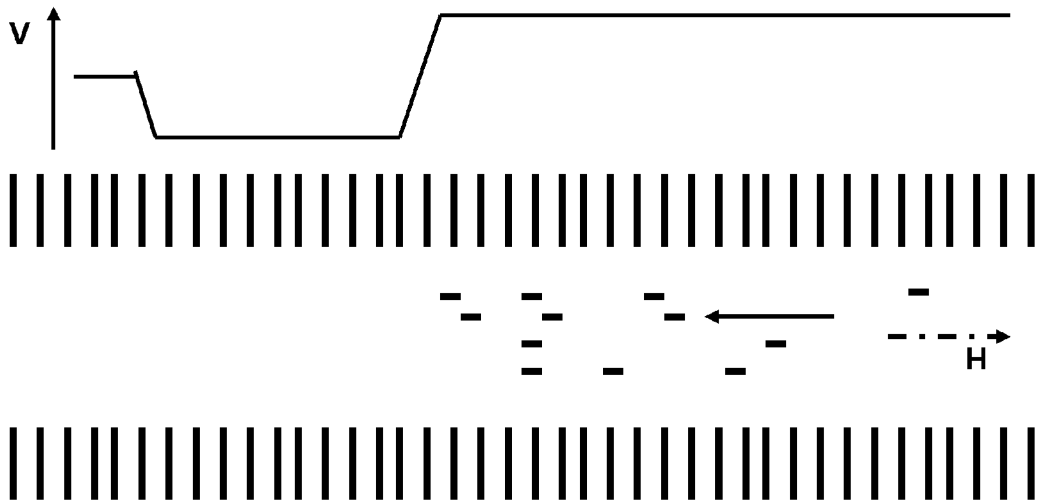
FIG. 3*a* is a cross sectional schematic view of a stacked-electrode fragmentation device, and an associated qualitative graph of the DC voltage as a function of axial position along the fragmentation device, illustrating creating and filling a DC potential well, in accordance with one embodiment of the invention.
Figure 3B:
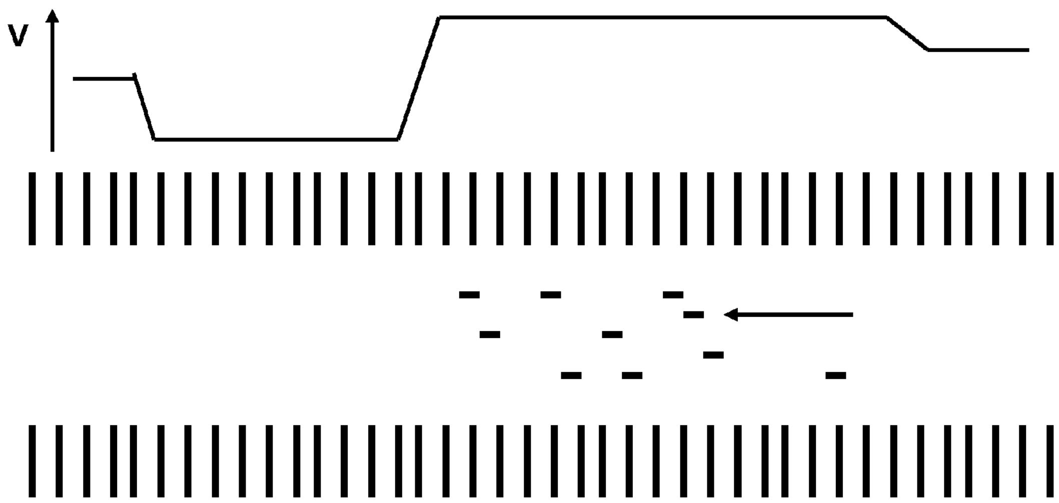
FIG. 3*b* is a cross sectional schematic view of a stacked-electrode fragmentation device, and an associated qualitative graph of the DC voltage as a function of axial position along the fragmentation device, illustrating creating and filling a DC potential well, in accordance with one embodiment of the invention.

Illustrating one option for filling a potential well, FIGS. 3*a* and 3*b* each are cross sectional schematic representations of the stacked-electrode fragmentation device 11, depicting the electrodes 110A and an associated qualitative graph of the DC voltage as a function of position along the set 110 of electrodes 110A. The location of peptide ions and negatively charged particles is indicated: plus signs denote positively charged peptide ions and negative signs denote negatively charged reagent ions and/or free electrons. A control module, such as the control unit 14, is configured to apply the DC voltages to each electrode 110A, as desired, to support formation and filling of DC potential wells.

As illustrated in FIG. 3*a*, a DC potential barrier has been formed, while admitting negatively charged particles (reagent ions and/or free electrons), so that the ions, admitted at one end of the set 110 do not flow through the set 110 and out the other end. After a desired quantity of particles have been admitted into the fragmentation device 11, the control module adjusts DC voltages applied to the electrodes 110A to form a second DC barrier, preventing the admitted negatively charged particles from escaping, i.e., completing formation of a DC potential well.

Some embodiments of the invention include a magnetic field generator, such as a permanent magnet or an electromagnet. A magnetic field (field direction indicated by arrow H) is then optionally disposed in the radial-confinement region of the electrodes 110A. The magnetic field supports radial confinement of electrons, assisting optional use of the device 11 for, for example, ECD.

FIG. 3*b* illustrates a variation of the DC voltage configuration depicted in FIG. 3*a*. Here, the negatively charged particles are admitted into a partially formed well. In some instances, it will be preferred to complete the well after admitting ions and/or electrons to reduce the kinetic energy that the ions/electrons have upon confinement in the well. In some cases, collisional cooling with a buffer gas, such as argon, serves to reduce the kinetic energy of ions in the fragmentation device 11.

Negatively charged reagent ions are optionally provided by any suitable source, including known sources, such as a chemical-ionization (CI) source.

Figure 4:
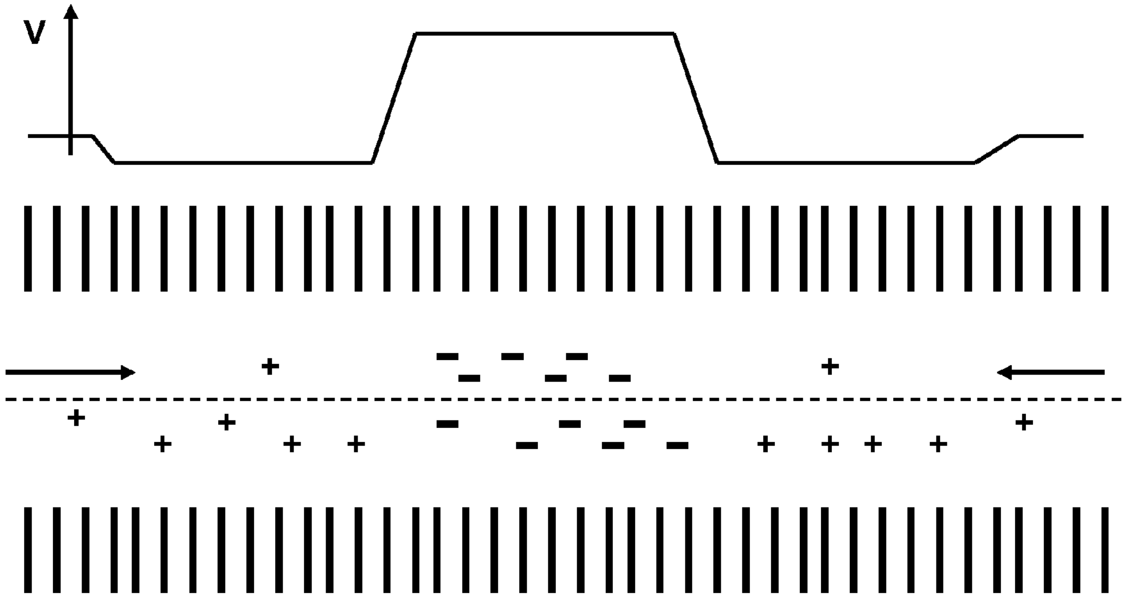
FIG. 4 is a schematic view of a fragmentation device and the associated DC voltage graph, illustrating a completed, and filled, positive potential well, and the filling of two neighboring partially formed negative potential wells, in accordance with one embodiment of the invention.
Figure 5A:
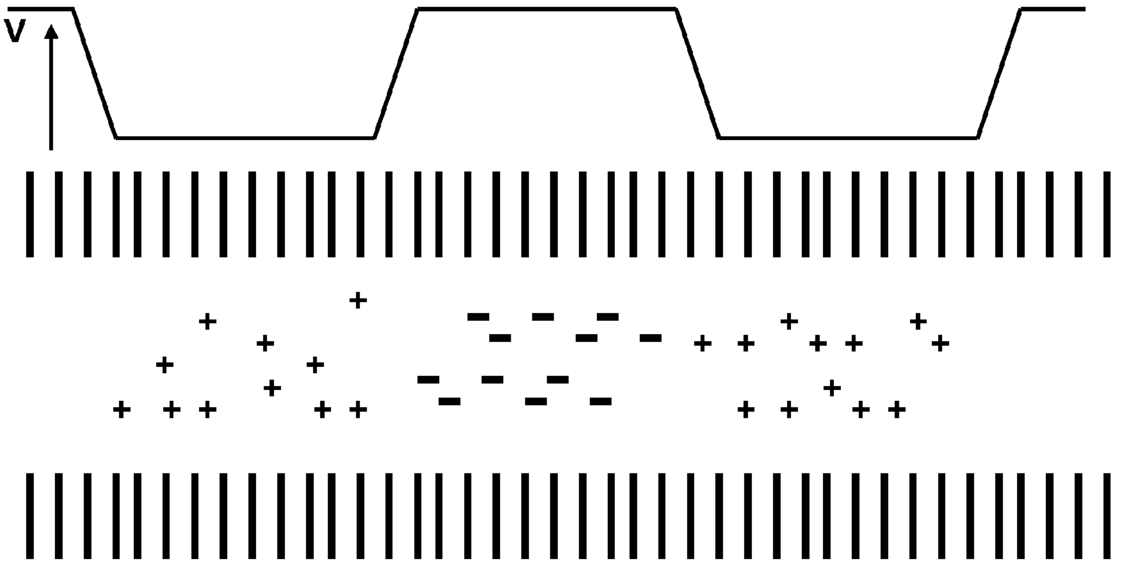
FIG. 5*a* is a schematic view of a fragmentation device and an associated DC voltage graph, in association with FIG. 4, illustrating a completed, and filled, positive potential well, and completed and filled neighboring negative potential wells, in accordance with one embodiment of the invention.

FIG. 4 illustrates a completed, and filled, positive potential well, and the filling of two neighboring partially formed negative potential wells. Positive peptide ions are admitted, in this example, from both ends of the fragmentation device 11. More generally, in view of the description provided herein, it will be apparent that wells are optionally formed and filled in a variety of sequences, with peptide ions and reagent ions being admitted from one or both ends of the set 110 of stacked electrodes 110A. For example, in one preferred embodiment, three filled wells are created as follows: 1) a positive DC potential barrier is formed and peptide ions are admitted from one end of the device 11; 2) the first well is completed by forming a second DC potential barrier to axially confine the admitted peptide ions; 3) negative reagent ions are admitted from the same end of the device as were the peptide ions (the reagent ions encounter a negative potential barrier that maintains their separation from, and adjacent to, the stored peptide ions; 4) the second well is completed by forming a third DC potential barrier to axially confine the admitted reagent ions; 5) a third filled well (for more peptide ions) is created in a manner similar to the first well. At this stage of processing the device 11 appears as illustrated by FIG. 5*a*.

Suitable peptide ions include, for example, singly- or multiply-protonated peptide molecules (precursor ions), generated by a ionized-sample source. The source, such as the source 12, is any suitable source, including known sources. For example, the peptide ion source 12 is optionally any one of, or combination of: (i) an Electrospray ionization (ESI) ion source; (ii) an Atmospheric Pressure; (iii) an Atmospheric Pressure Chemical Ionization ((“APCI”) ion source; (iii) an Atmospheric Pressure Photo Ionization (“AAPPI”) ion source; (iv) a Matrix Assisted Laser Desorption Ionization ("MALDI") ion source; (v) a Laser Desorption Ionization ("LDI") ion source; (vi) an Inductively Coupled Plasma ("ICP) ion source; (vii) an Electron Impact ("EI") ion source; (viii) a Chemical Ionization ("CI") ion source; (ix) a Fast Atom Bombardment ("FAB") ion source; and (x) a Liquid Secondary Ions Mass Spectrometry ("LSIMS") ion source. Further examples of alternatives for a source 12 are described below, with reference to FIG. 8.

Reagent ions are any suitable ions, including known ions. Some polyaromatic (polycyclic aromatic) hydrocarbon (PAH) compounds are particularly well suited as reagents. Alternatively, some azo compounds (which have a N═N bond, i.e., a nitrogen-nitrogen double bond) are suitable; azobenzene, in particular, is well suited as a reagent. More generally, some suitable reagents have aryl rings connected by conjugated double bonds, such as an azo N═N bond, or a hydrocarbon C═C bond.

Polyaromatic hydrocarbon anions are generated, for example, from a low electron affinity compound such as anthracene, 9,10-diphenyl-anthracene, naphthalene naphthalene, fluorene, phenanthrene, pyrene, fluoranthene, chrysene, triphenylene, perylene, acridine, 2,2'-dipyridyl, 2,2'-biquinoline, 9-anthracenecarbonitrile, dibenzothiophene, 1,10'-phenanthroline, 9'-anthracenecarbonitrile, and anthraquinone. Anions are alternatively generated from substituted derivatives of these low electron affinity compounds.

Alternatively, modified aromatic hydrocarbons, which include, for example, sulfur, oxygen and/or nitrogen (heterocyclics), are suitable reagent compounds.

Substituted azonitrile compounds include some suitable compounds, such as VAZO free-radical source compounds (available from DuPont) such as VAZO 68 4,4'-axobis (4-cyanovaleric acid).

Some additional specific reagent radical anions are formed from sulfur dioxide, fluoranthene, diphenylanthracene, 2,2' biquinoyline, and azulene. Though the fragmentation process is not entirely understood, some suitable reagents are associated with anions having sufficiently low electron affinities to act as electron donors for an ECD-like reaction with peptide cations. Benzyl peroxide is another suitable compound.

Reagent anions are prepared by any suitable technique, including known techniques, such as atmospheric-pressure chemical ionization (APCI), glow discharge or electrospray ionization (ESI). Some preferred anions have a m/z range of 100-1000, low (or negative) electron affinity, potentially in an excited state, are radical (i.e., have odd electrons in an outer shell) are sufficiently stable for transfer into a fragmentation cell, and/or are double-charged anions.

Some suitable reagents are neutral rather than ionic. For example, some alkali metals, such as cesium, are suitable, likely because they tend to readily surrender an electron. Thus, in the case of some reagents, electrons are transferred from one or more neutral, non-ionic or uncharged gases, vapors or atoms selected, for example, from sodium, lithium, potassium, rubidium, francium, $C_{60}$, and magnesium.

As an alternative to electron transfer, protons may be transferred from one or more multiply charged analyte cations or positively charged ions to one or more neutral, non-ionic or uncharged reagent gases or vapors whereupon at least some of the multiply charged analyte cations or positively charged ions are preferably reduced in charge state. It is also contemplated that some of the cations may also be induced to dissociate and form product or fragment ions. The multiply charged analyte cations or positively charged ions preferably include peptides, polypeptides, proteins or biomolecules.

Features of the invention are applicable to PTR as well as ETD. According to an embodiment, in order to cause PTR, either the reagent anions or negatively charged ions may be derived from a compound selected from a group including: (i) carboxylic acid; (ii) phenolic; and (iii) a compound containing alkoxide. The reagent anions or negatively charged ions may alternatively be derived from a compound selected from the group of: (i) benzoic acid; (ii) perfluoro-1, 3-dimethylcyclohexane or PDCH; (iii) sulphur hexafluoride or SF6; and (iv) perfluorotributylamine or PFTBA. According to an embodiment, the one or more reagent gases or vapors include a superbase gas. The one or more reagent gases or vapors may be selected from the group of: (i) 1,1,3,3-Tetramethylguanidine ("TMG"); (ii) 2,3,4,6,7,8,9,10-Octahydropyrimidol [1,2-a]azepine {Synonym: 1,8-Diazabicyclo[5.4.0]undec-7-ene ("DBU")}; or (iii) 7-Methyl-1,5,7-triazabicyclo[4.4.0] dec-5-ene ("MTBD") {Synonym: 1,3,4,6,7,8-Hexahydro-l-methyl-2H-pyrimido[l,2-a]pyrimidine}. Further embodiments are contemplated wherein the same reagent ions or neutral reagent gas that is disclosed above in relation to causing ETD may also be used to cause PTR.

FIG. 5*a* illustrates three completed, and filled, DC potential wells: a positive potential well storing reagent ions and two neighboring negative potential wells storing positively charged peptide ions. In view of the above description, it will be apparent that one or more wells are optionally formed and filled for each polarity of particles, with particles admitted from one or both ends of a device.

Figure 5B:
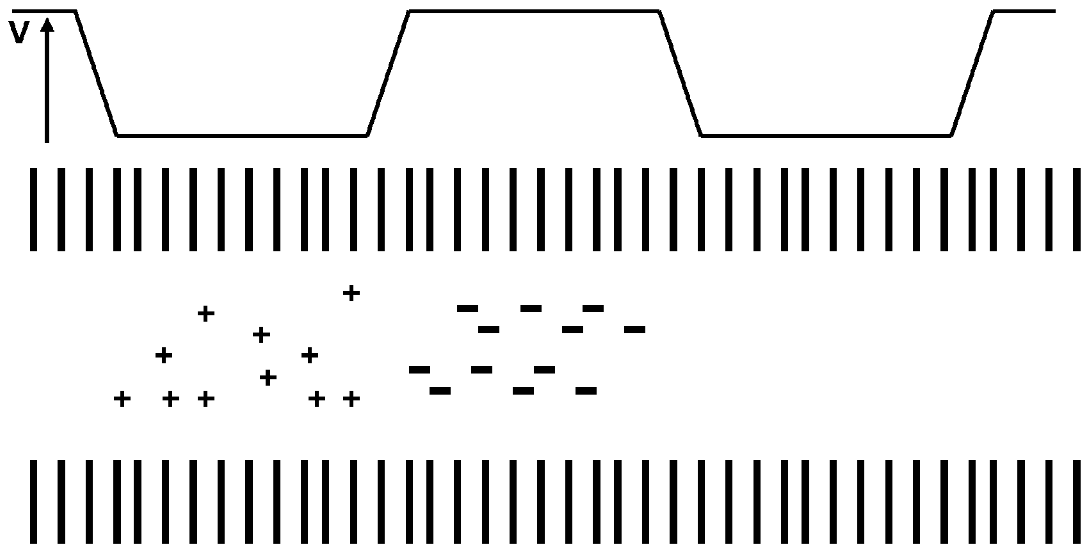
FIG. 5*b* is a schematic view of a fragmentation device and an associated DC voltage graph, similar to that of FIG. 5*a*, in which a positive potential well is filled, a neighboring negative potential well is filled, and a second negative potential well is empty, in accordance with one embodiment of the invention.
Figure 6A:
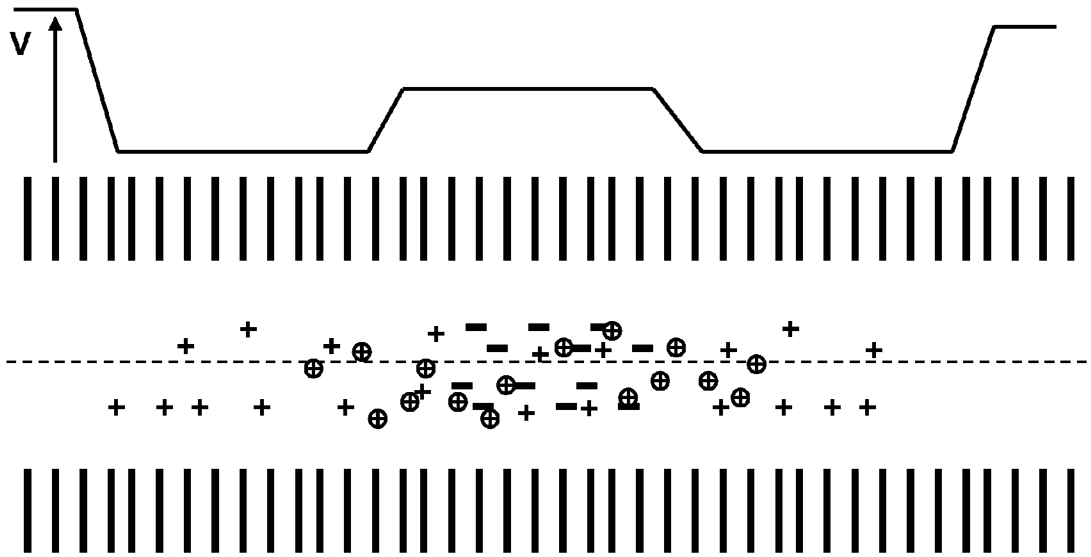
FIG. 6*a* is a schematic view of a device and associated voltage graph, in association with FIGS. 5*a* and 5*b*, illustrating an option for mixing and reacting stored opposite-polarity ions, in accordance with one embodiment of the invention.
Figure 6B:
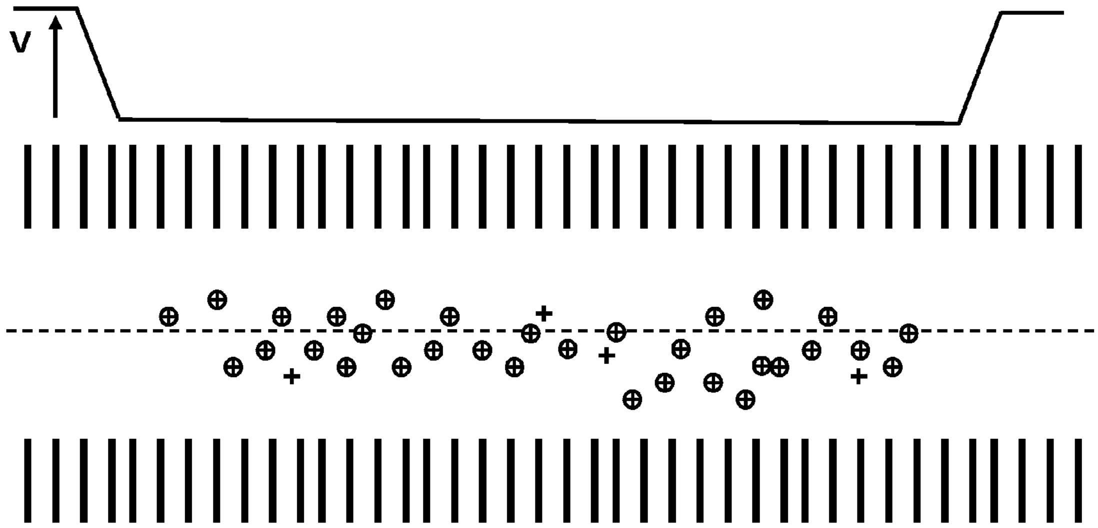
FIG. 6*b* is a schematic view of a device and associated voltage graph, illustrating fragments trapped in a single well of a fragmentation device, prior to release from the device, in accordance with one embodiment of the invention.
Figure 7:
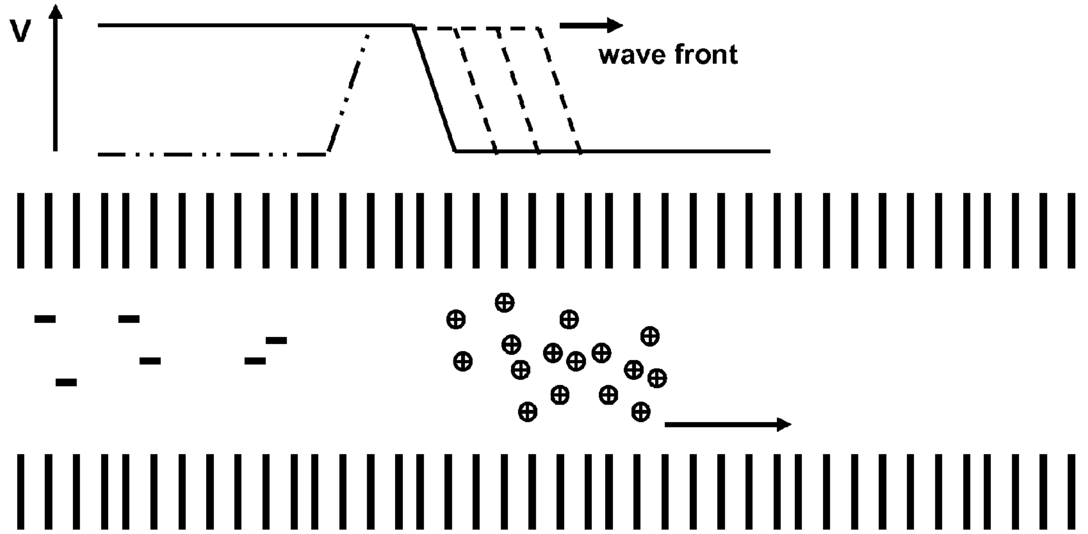
FIG. 7 is a schematic view of a device and associated voltage graph, illustrating options for releasing peptide fragments from the device, in accordance with one embodiment of the invention.

FIG. 5*b* is a schematic view of a device and an associated DC voltage graph, similar to that of FIG. 5*a*, in which a positive potential well is filled, a neighboring negative potential well is filled, and a second negative potential well is empty, in accordance with one embodiment of the invention;

Next, with reference to FIGS. 6*a*, 6*b* and 7, the formation and ejection of peptide fragments are described.

FIG. 6*a*, in association with FIG. 5*a*, illustrates one option for mixing of stored opposite-polarity ions. The nested reagent ion well has been reduced in depth, to commence mixing; that is, the DC voltage level applied to the electrodes 110A defining the negative potential well have been reduced.

The reduction in well depth is associated with a corresponding height reduction of the two DC potential barriers associated with the well. The barrier reduction permits peptide ions to begin to mingle, and react with, the negatively charged ions; by preserving some level of the negative well, at least some confinement of negative ions remains.

The reduction in well depth is particularly suitable if, for example, at least some of the peptide ions have greater kinetic energy than at least some of the regent particles. In this case, the reduced well can continue to confine negative particles while admitting peptide ions. For example, room temperature electrons can be confined in a reduced well, while hotter peptide ions can penetrate the remaining potential barrier associated with the reduced well, to mingle with the confined electrons.

Alternatively, the nested negative potential well is entirely removed (see FIG. 6*b*) leaving a single, large positive well. In this case, some negative ions will flow past the positive peptide ions, and out of the reaction zone in the stacked electrodes 110A.

As the oppositely charged ions mix and react, at least some of the peptide ions fragment, as illustrated in FIGS. 6*a* and 6*b*. FIG. 6*b* illustrates fragments trapped in a single well of a fragmentation device, prior to release from the device, in accordance with one embodiment of the invention.

After formation of fragments, the fragments are manipulated and/or analyzed in the fragmentation device and/or ejected from the fragmentation device for analysis, for example, in the mass-spectrometry unit 13.

Where the negatively charged particles are electrons, some methods of the invention provide ECD of peptides. Capture of an electron by a protonated peptide is associated with an exothermic reaction, releasing, for example, 6 eV. The peptide's backbone fragments, leading, for example, to c and z fragments.

Next, referring to FIG. 7, one alternative to simply allowing ions to flow out of the fragmentation device 110 is to use travelling DC potential barriers to propel ions toward an exit of the device and/or separate ions prior to ejection. See, e.g., Giles et al., "Applications of a Travelling Wave-Based Radio-Frequency-Only Stacked Ring Ion Guide", Rapid Commun. in Mass Spectrom., 2004, 2401-2414.

FIG. 7 illustrates two options for propelling peptide fragments from the fragmentation device 11. As illustrated, a DC potential barrier (a shown with dashed line) or, for example, a DC potential pulse (as shown with variable dashed line) travels toward one end of the device the set 110 stacked rings 110A. The fragments "surf" on the barrier, or pulse, until reaching an end of the set 110. At the same time, remaining negatively charged reagent ions are accelerated, crossing the barrier, toward the opposite end of the set 110. As is known in the mass analysis arts, a series of travelling pulses can be used to separate ions according to their mobility.

Mobility separation is optionally used, for example, to remove ions having a mass outside a selected mass window around precursor ions and/or reagent ions. Ion separation can improve mass-analysis sensitivity and duty cycle.

As noted, the apparatus 10 optionally includes an analysis module 13. In one alternative embodiment, the fragments are fed to a mass spectrometer (MS). The MS is any suitable device, including known devices. For example, the MS is a quadrupole mass filter, a time-of-flight (TOF) mass analyzer, a Fourier Transform Ion Cyclotron Resonance (FTICR) mass analyzer, or a 2D (linear) quadrupole ion trap or a 3D (Paul) quadrupole ion trap.

Some embodiments of the invention advantageously include separate ion sources for analytes and regents, to generate cation analytes and reagent anions. In order to efficiently introduce both cations and anions from separate ion sources into a fragmentation device 11, one option is to use an ion guide that simultaneously and continuously receives and transfers ions of either polarity from multiple ion sources at different locations. One suitable ion guide for this purpose is described in U.S. Pat. No. 6,891,157 to Bateman. Next referring to FIG. 8, one embodiment includes such an ion guide.

Figure 8:
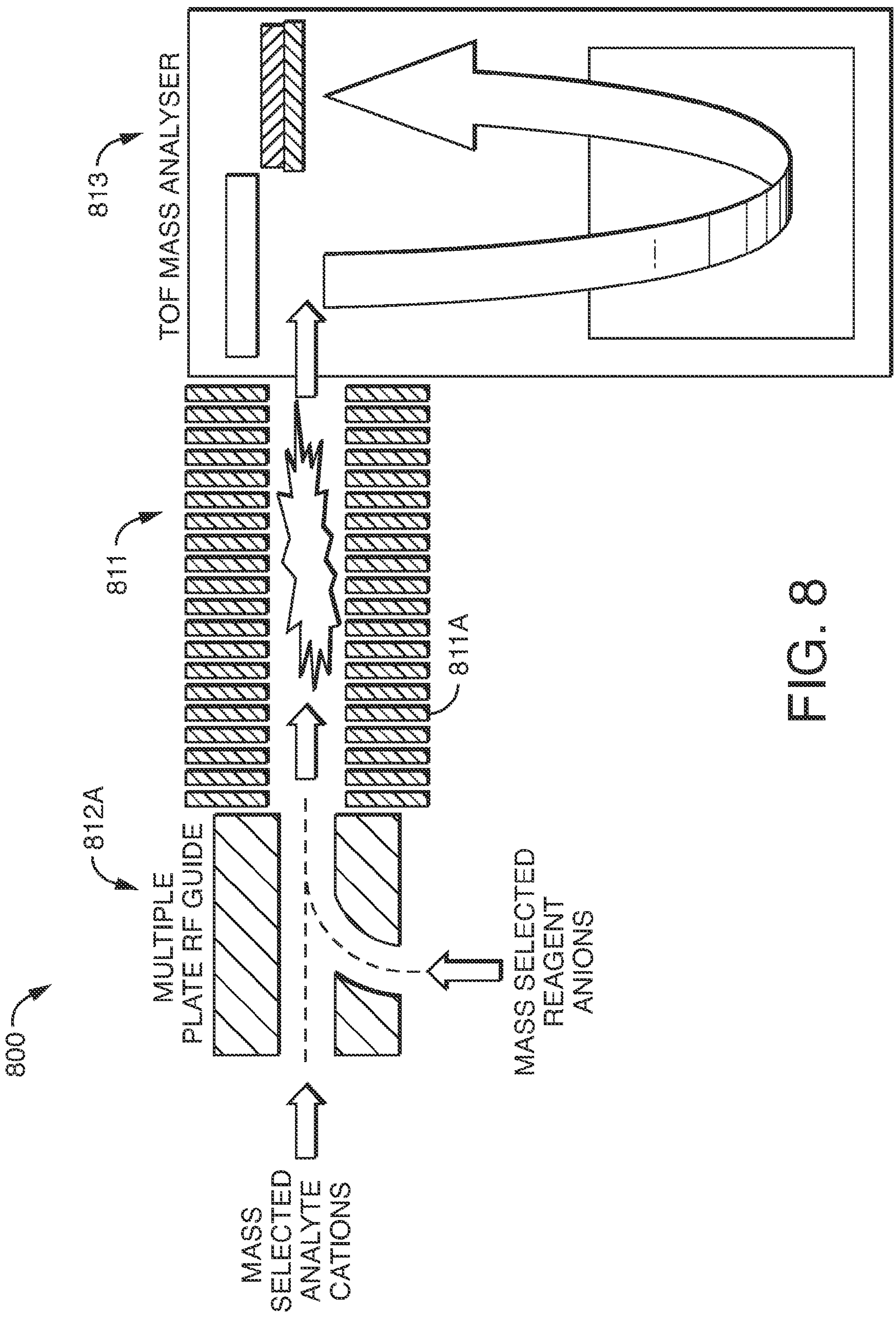
FIG. 8 is a schematic diagram of a chemical processing apparatus, in accordance with one embodiment of the invention.

FIG. 8 is a schematic diagram of an chemical analysis apparatus 800, according to one embodiment of the invention. The apparatus 800 includes an ion guide 812A, a fragmentation device 811, and a TOF mass analyzer 813. The ion guide 812A introduces both cations and anions, from separate ion sources, into the fragmentation device 811, and the TOF mass analyzer 813 receives peptide ions and ion fragments from the fragmentation device 811. The fragmentation device 811 includes stacked electrodes 811A. It is also preferable that a mass selective device, such as a quadrupole-based mass filter, is utilized to select the analyte and/or the reagent between each ion source and the ion guide 812A. In this example, the TOF mass analyzer 813 analyzes the product (i.e., fragment) ions downstream of the reaction zone of the fragmentation device 811.

Returning now to the control unit 14, the unit 14 has any suitable configuration for individually and selectively applying DC voltages to the electrodes 110A of the fragmentation device 11. The control unit 14 is in data and/or electrical communication with other components of the apparatus 10 via wired and/or wireless means, such as those known in the data-communication arts. The control unit 14 receives process data, for example, from the mass-spectrometer module 13, and provides control signals to other components, for example, the fragmentation device 11. The control unit 14 is configured to support automation of operation of the apparatus 10. The control unit 14, in various illustrative embodiments, is implemented in software, firmware, and/or hardware (e.g., as an application-specific integrated circuit), and includes, if desired, a user interface. The control unit 14 includes and/or is in communication with storage component(s).

Suitable implementations of the control unit 14 include, for example, one or more integrated circuits, such as microprocessors. A single integrated circuit or microprocessor in some alternative embodiments includes the control unit 14 and other electronic portions of the apparatus 10. In some embodiments, one or more microprocessors implement software that enables the functions of the control unit 14. In some embodiments, the software is designed to run on general-purpose equipment and/or specialized processors dedicated to the functionality herein described.

In some implementations of the apparatus 10, the control unit 14 includes a user interface to support interaction with the control unit 14 and/or other portions of the apparatus 10. For example, the interface is configured to accept control information from a user and to provide information about the apparatus 10 to a user. The user interface is used, for example, to set system control parameters and/or to provide diagnostic and troubleshooting information to the user. In one embodiment, the user interface provides networked communication between the apparatus 10 and users located either local to the operating environment or remote from the operating environment. The user interface in some implementations is used to modify and update software.

Where a travelling pulse(s) and/or barrier(s) are used to manipulate ions in the fragmentation device 11, the control unit 14 is configured to control parameters such as pulse shape, wavelength and amplitude. These parameters can also be optimized to provide control over the relative ion velocity of cations and anions. Also, the velocity of ion-neutral collisions can be manipulated to exploit collision induced dissociation (CID) within the fragmentation device 13.

Variations, modifications, and other implementations of what is described herein will occur to those of ordinary skill in the art without departing from the scope of the invention as claimed. Accordingly, the invention is to be defined not by the preceding illustrative description but instead by the scope of the following claims.

What is claimed is:

1. A method of protein analysis, comprising:

providing a fragmentation device comprising stacked electrodes that each define an aperture, the apertures defining an ion-manipulation region and an axial direction of the fragmentation device;

confining positive peptide ions in a first DC potential well in the ion-manipulation region;

confining negatively charged particles in a second DC potential well in the ion-manipulation region;

reducing a DC barrier between the first and second DC potential wells to a non-zero level to mix the positive peptide ions and the negatively charged particles, in the ion-manipulation region, to fragment at least some of the positive peptide ions, wherein at least some of the positive peptide ions and the negatively charged particles are confined in the reduced first and second DC potential wells; and mass analyzing at least some of the peptide ion fragments.

2. The method of claim 1, further comprising applying at least a first DC voltage to at least two contiguous electrodes of the stacked electrodes to define the first DC potential well, and applying at least a second DC voltage to at least two different contiguous electrodes of the stacked electrodes to define the second DC potential well.

3. The method of claim 1, wherein the negatively charged particles comprise electrons, and further comprising forming a magnetic field to confine the electrons in the ion-manipulation region in a radial direction that is perpendicular to the axial direction.

4. The method of claim 3, wherein the magnetic field has a field direction parallel to the axial direction of the fragmentation device.

5. The method of claim 3, wherein the electrons have a kinetic energy in a range of about 0.02 eV to about 5 eV.

6. The method of claim 1, wherein the electrodes comprise ring electrodes.

7. The method of claim 1, wherein the negatively charged particles comprise reagent anions.

8. The method of claim 1, wherein reducing the DC potential barrier comprises reducing the depth of the second DC potential well.

9. The method of claim 1, wherein the first DC potential well has a depth of about −10 volts or less.

10. The method of claim 1, wherein the second DC potential well has a depth of about +10 volts or less.

11. The method of claim 1, further comprising confining additional positive peptide ions in a third DC potential well in the ion-manipulation region.

12. The method of claim 11, wherein the second DC potential well is disposed between the first and third potential wells.

13. A chemical processing apparatus, comprising:

a fragmentation device, comprising a plurality of electrodes disposed in series along a longitudinal axis of the fragmentation device and defining an ion-manipulation region;

means for applying at least a first DC voltage to at least two contiguous electrodes of the plurality of electrodes to define a first DC potential well, and applying at least a second DC voltage to at least two different contiguous electrodes of the plurality of electrodes to define a second DC potential well;

means for reducing a DC potential barrier between the first and second DC potential wells to a non-zero level to permit positive peptide ions, confined in the first DC potential well, and negatively charged particles, confined in the second DC potential well, to mix, wherein at least some of the positive peptide ions and the negatively charged particles are confined in the reduced first and second DC potential wells; and a mass-spectrometry module for analyzing at least some fragments of the positive peptide ions extracted from the mixture.

14. The mass spectrometer of claim 13, further comprising a control unit comprising the means for applying the DC voltages and the means for reducing the DC potential barrier.

15. The mass spectrometer of claim 13, further comprising means for introducing a magnetic field in the fragmentation device for radial containment of the negatively charged particles in the ion-manipulation region.

16. The mass spectrometer of claim 13, wherein the fragmentation device comprises a stacked-ring ion guide.

17. The mass spectrometer of claim 13, wherein the negatively charged particles are electrons, and further comprising a magnetic field generator configured to apply a magnetic field parallel to the longitudinal axis, and an electron source for filling the second DC potential well with electrons having a kinetic energy in a range of about 0.02 eV to about 5 eV.

* * * * *